(12) United States Patent
Takarasawa et al.

(10) Patent No.: US 6,446,324 B1
(45) Date of Patent: Sep. 10, 2002

(54) STACKED LAYERED CORE AND METHOD FOR MANUFACTURING THE SAME

(75) Inventors: Noboru Takarasawa; Masato Gomyo, both of Nagano (JP)

(73) Assignee: Sankyo Seiki Mfg Co., Ltd., Nagano (JP)

( * ) Notice: Subject to any disclaimer, the term of this patent is extended or adjusted under 35 U.S.C. 154(b) by 0 days.

(21) Appl. No.: 09/848,115

(22) Filed: May 2, 2001

(30) Foreign Application Priority Data

May 10, 2000 (JP) ........................................ 2000-136699

(51) Int. Cl.[7] .............................................. H02K 15/16
(52) U.S. Cl. ........................ 29/596; 310/216; 310/259; 29/606; 29/609
(58) Field of Search ................................. 310/216, 254, 310/43, 259; 29/596, 598, 606, 605, 609

(56) References Cited

U.S. PATENT DOCUMENTS

| | | | | |
|---|---|---|---|---|
| 2,711,008 A | * | 6/1955 | Smith | 29/155.5 |
| 4,149,309 A | * | 4/1979 | Mitsui | 29/596 |
| 5,255,425 A | * | 10/1993 | Kanno | 29/596 |
| 5,722,152 A | * | 3/1998 | Sumi et al. | 29/596 |
| 5,911,453 A | * | 6/1999 | Boyd, Jr. et al. | 29/596 |
| 6,154,950 A | * | 12/2000 | Katahira et al. | 29/598 |
| 6,167,610 B1 | * | 1/2001 | Nakahara et al. | 29/596 |
| 6,225,725 B1 | * | 5/2001 | Itoh et al. | 310/254 |
| 6,226,856 B1 | * | 5/2001 | Kazama et al. | 29/596 |

* cited by examiner

Primary Examiner—Joseph Waks
Assistant Examiner—Thanh Lam
(74) Attorney, Agent, or Firm—Hogan & Hartson, LLP

(57) ABSTRACT

A stacked layered core includes a core body formed from a plurality of core, plates stacked in layers, each of the core plates having a connection base section formed in a circular shape and a plurality of salient pole sections radially extending from an external peripheral surface or an internal peripheral surface of the connection base. The circular connection base section has a fixing-side peripheral surface on the opposite side of the salient pole sections. At least one retaining recessed section is provided in the fixing-side peripheral surface of the connection base section. A dielectric film may be formed over an external surface of the core body. The retaining recessed section has a depth greater than a thickness of a bump portion of the dielectric film formed in the retaining recessed section such that the bump portion of the dielectric film is contained inside the retaining recessed section.

4 Claims, 6 Drawing Sheets

STACKED LAYERED CORE AND METHOD FOR MANUFACTURING THE SAME

BACKGROUND OF THE INVENTION

1) Field of the Invention

The present invention relates to a stacked layered core used in a variety of motors and a method for manufacturing the stacked layered core, and more particularly, to a stacked layered core having a stacked core body including a plurality of core plates stacked together and a dielectric film coated over an external surface of the stacked core body and a method for manufacturing the same.

2) Related Art

Figure 8:
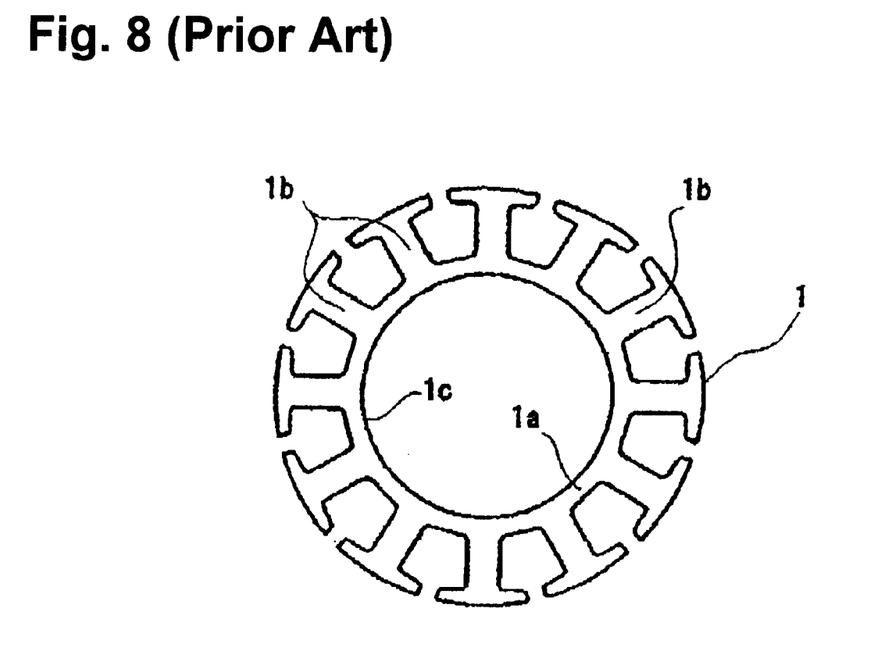
FIG. 8 shows a plan view of a core plate for an ordinary stacked layered core.
Figure 9:
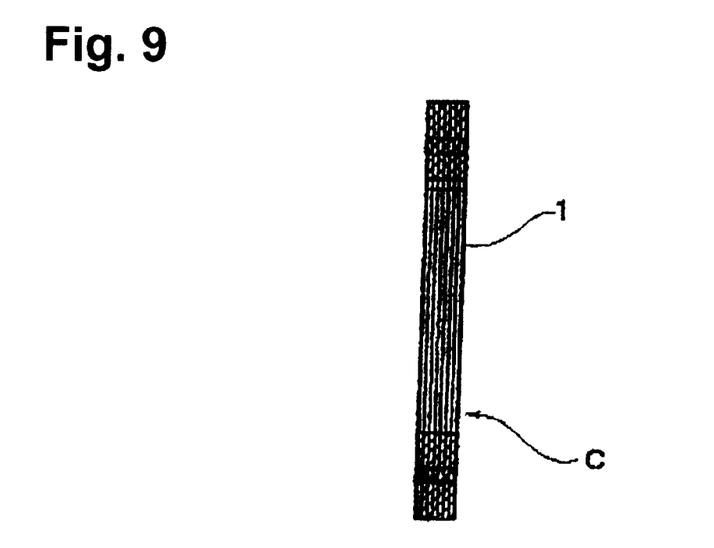
FIG. 9 shows a cross-sectional view of a stacked layered core composed of the core plates shown in FIG. 8.

Generally, a stacked layered core used in a variety of motors is formed from a plurality of thin plate-like core plates 1 shown in FIG. 8, for example, that are stacked together, as shown in FIG. 9. FIGS. 8 and 9 show a stacked layered core C for an outer rotor type motor, and core plates 1 that compose the stacked layered core C. The stacked layered core has a circular connection based section 1a provided at a central portion thereof and a plurality of salient pole sections 1b that are outwardly, radially extending in a radial direction from an outer peripheral surface of the circular connection based section 1a. A fixing-side peripheral surface 1c on the internal peripheral side of the circular connection base section 1a, i.e., an internal bore of the circular connection base section 1a, engages a holder (not shown) whereby the stacked layered core is affixed to the holder.

Figure 5:
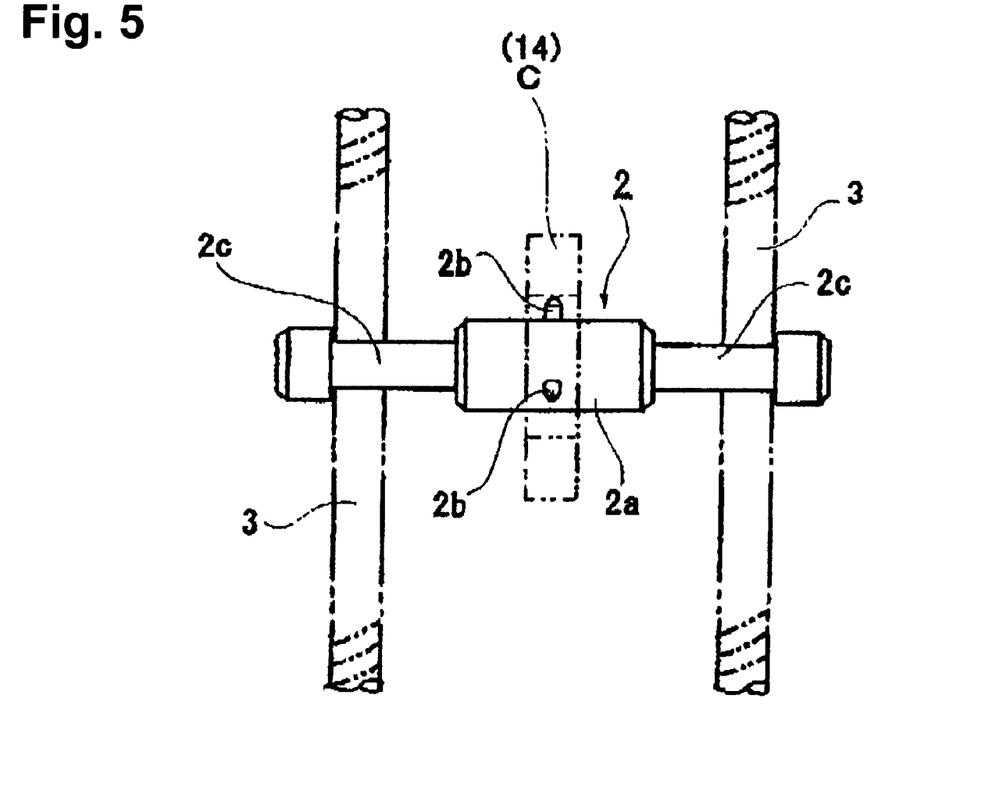
FIG. 5 shows a plan view of an example of a core retaining jig.
Figure 6:
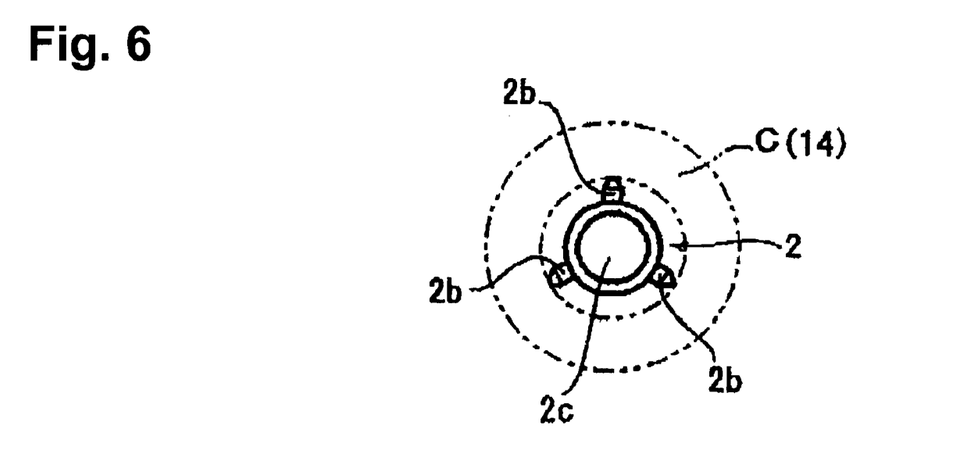
FIG. 6 shows a side view of the core retaining jig shown in FIG. 5.

A dielectric film is coated over an external surface of the stacked layered core C by a powder painting or an electrodeposition painting. Driving coils (not shown) are wound about the salient pole sections 1b over the dielectric film. When the dielectric film is formed, a core retaining jig 2 shown in FIG. 5 and FIG. 6 is used to support the entire body of the stacked layered core C. More concretely, the core retaining jig 2 has a boss section 2a and three protruded sections 2b radially protruding from the boss section 2a.

The protruded sections 2b of the core retaining jib 2 are abutted to the internal surface of the connection base section 1a of the stacked layered core C, in other words, to the fixing side peripheral surface 1c provided on a side opposite to the side where the protruded salient poles 1b protrude, whereby the entire body of the staked layered core C is supported by the core retaining jig 2.

Figure 10:
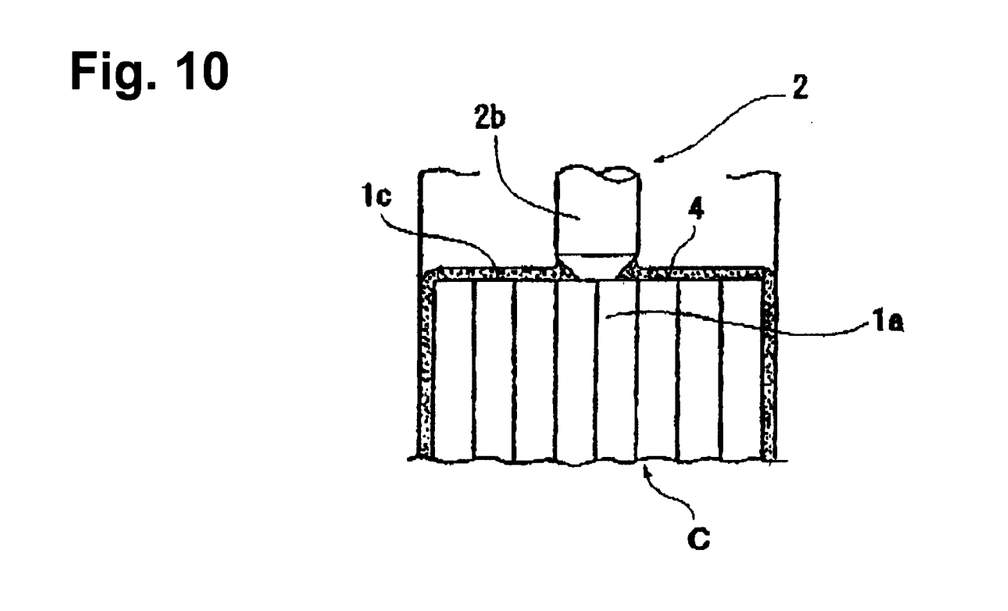
FIG. 10 shows an enlarged side view of a portion of the ordinary stacked layered core shown in FIG. 8 and FIG. 9 supported by the core retaining jig after painting is performed.
Figure 11:
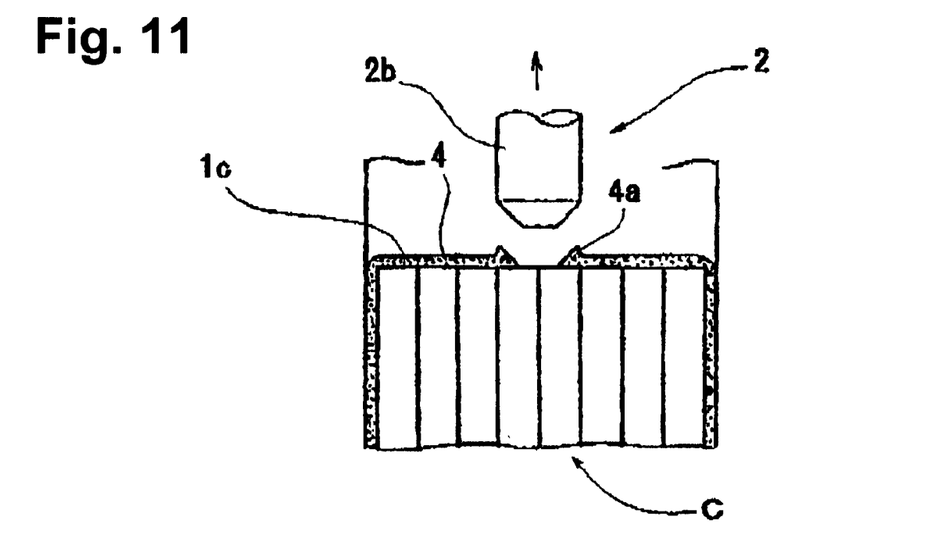
FIG. 11 shows a side view of the portion of the ordinary stacked layered core after the core retaining jig shown in FIG. 10 is removed.

Then, one pair of shaft sections 2c provided on both sides of the boss section 2a of the core retaining jig 2 are set at a pair of screw conveyors 3, 3 provided in a painting apparatus, as shown in FIG. 5. Then, the screw conveyors 3 are rotatably driven to transfer the stacked layered core C together with the core retaining jig 2, to paint a dielectric film as described above. At this moment, as shown in FIG. 10, the protruded sections 2b of the core retaining jig 2 are in contact with the fixing-side internal peripheral surface 1c of the circular connection base section 1a of the stacked layered core C. When the painting of the dielectric film 4 is completed, one of the protruded sections 2b that is capable of moving in a radial direction is pushed toward the center of the core retaining jig 2. As a result, the other two protruded sections 2b are separated from the fixing-side internal peripheral surface 1c as shown in FIG. 11, such that the core retaining jig 2 can be removed from the stacked layered core C.

However, at a portion of the stacked layered core C from where the core retaining jig 2 is removed, in other words, at a portion of the stacked layered core C that has been in contact with each of the protruded sections 2b, a bump 4a of the dielectric film 4 is formed in the form of a bur.

Therefore, in order to maintain the internal dimension of the fixing-side internal peripheral surface 1c of the stacked layered core C at a high precision level, a finishing process in which the bump sections 4a are removed or compressed needs to be performed. Also, when the core retaining jig 2 is removed, each of the protruded sections 2b of the core retaining jig 2 may come in contact with various portions of the stacked layered core C, with the result that the dielectric film 4 may be cut or scratched, which is the major cause of poor paint quality.

Furthermore, portions that have been in contact with the protruded sections 2b of the core retaining jig 2 would not be painted with the dielectric film 4, and therefore would remain to be exposed. Such portions would likely be rusted. Accordingly, a sealing material such as an adhesive may be used to cover the non-painted portions depending on the requirements. However, in this case, the sealing material may form bumps, which results in irregular internal diameters in the internal bore of the stacked layered core C.

SUMMARY OF THE INVENTION

It is an object of the present intention to provide a stacked layered core in which a dielectric film can be readily formed at a high precision and a method for manufacturing the same.

In accordance with one embodiment of the present invention, a stacked layered core may include a core body formed from a plurality of core plates stacked in layers, each of the core plates having a connection base section formed in a circular shape and a plurality of salient pole sections radially extending from an external peripheral surface of an internal peripheral surface of the connection base. The circular connection base section has a fixing-side peripheral surface on the opposite side of the salient pole sections. At least one retaining recessed section is provided in the fixing-side peripheral surface of the connection base section. A dielectric film is formed over an external surface of the core body. In one aspect of the present invention, the retaining recessed section has a depth greater than a thickness of a bump portion of the dielectric film. that may be formed in the retaining recessed section such that the bump portion of the dielectric film is contained inside the retaining recessed section.

In accordance with the present invention, even when bump portions of the dielectric coating film may be formed, they are formed inside the retaining recessed section and therefore do not protrude from the supporting recessed sections. Furthermore, although damages may be caused by protruded sections of a core retaining jig that is used to support. the stacked layered core when the core retaining jig is removed, such damages are generated only inside the retaining recessed sections formed in the connection base section of the stacked layered core. Therefore, the bump portions of the dielectric coating film and the damaged portions do not affect the diametrical dimensions of the stacked layered core at all when the connection base section of the stacked layer core is affixed to a bearing holder of a motor, and therefore the productivity of stacked layered cores can be improved.

Other features and advantages of the invention will be apparent from the following detailed description, taken in conjunction with the accompanying drawings that illustrate, by way of example, various features of embodiments of the invention.

PREFERRED EMBODIMENTS OF THE PRESENT INVENTION

A stacked layered core for an inner-rotor type motor in accordance with one embodiment of the present intention is described below with reference to the accompanying drawings. Prior to the description, an overall structure of a hard disk driving apparatus (HDD) equipped with a motor having a stacked layered core in accordance with one embodiment of the present intention is described below with reference to the accompanying drawing.

Figure 7:
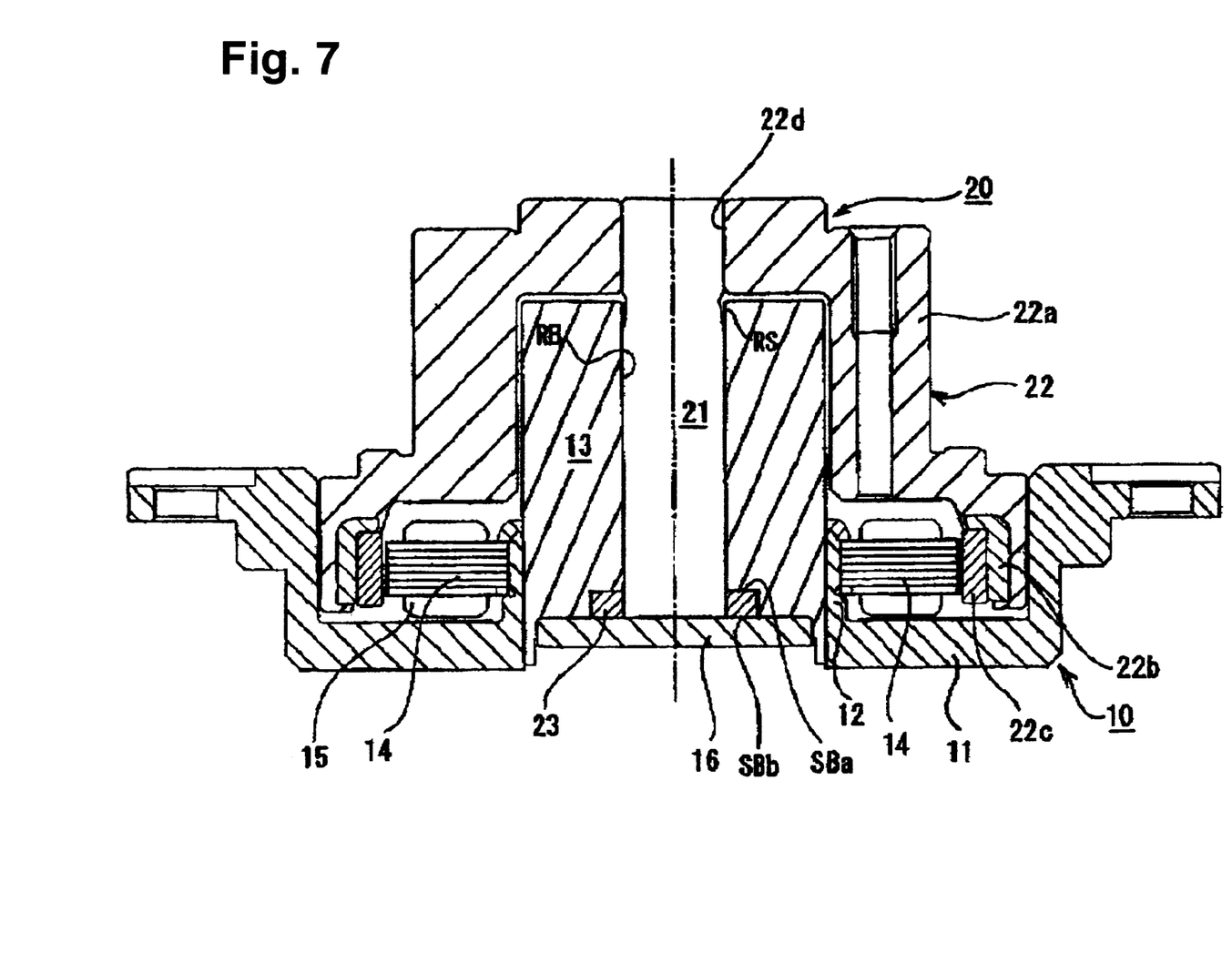
FIG. 7 shows a cross-sectional view of an exemplary structure of a motor for a hard drive apparatus equipped with a stacked layered core in accordance with the present invention.

FIG. 7 shows a spindle motor for a HDD with a rotary shaft 2 that is generally formed from a stator assembly 10 that defines a fixing member, and a rotor assembly 20 that defines a rotator member that is assembled with respect to the stator assembly 10. The stator assembly 10 has a fixing frame 11 that is fixedly screwed to a fixing base (not shown). The fixing frame 11 may be formed from an aluminum metal material in order to reduce its weight. A bearing holder 12 in a circular shape extends generally vertically about a center of the fixing frame 11. A bearing sleeve 13 that defines a fixed bearing member in a tubular cylindrical form is connected to the bearing holder 12 by a pressure insertion method or a shrink-fit method. The bearing sleeve 13 may be formed from a copper alloy material such as phosphorous bronze in order to facilitate the work to form holes of small diameters.

Figure 1:
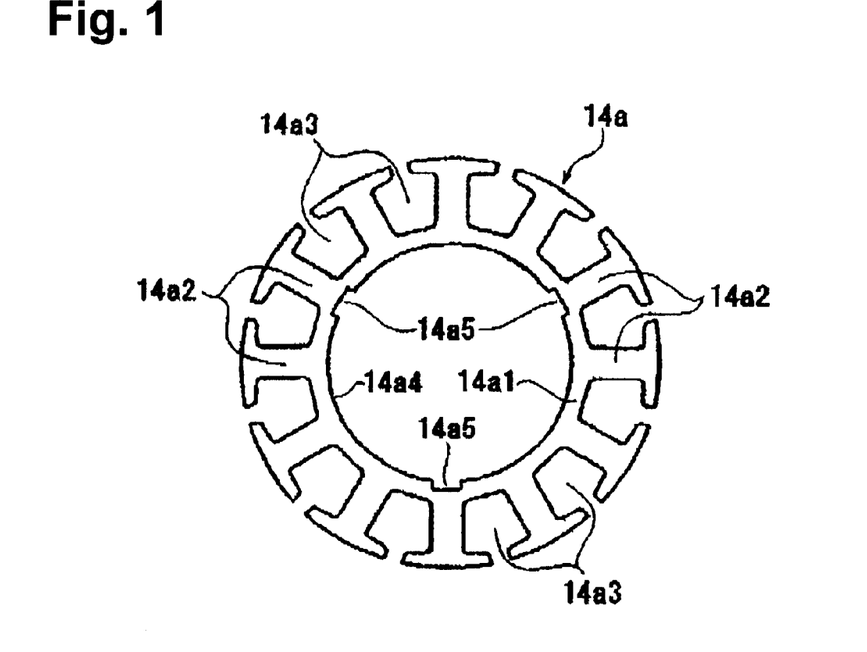
FIG. 1 shows a plan view of a core plate of a stacked layered core for motor in accordance with one embodiment of the present intention.

A stacked layered stator core 14 in accordance with one embodiment of the present invention is formed from a body of stacked core plates that are formed from electromagnetic steel plates. The stacked layered stator core 14 is attached to an external peripheral mounting surface of the bearing holder 12. The stacked layered stator core 14 is formed by stacking in layers a plurality of core plates 14a shown in FIG. 1. As shown in FIG. 1, the stacked layered stator core 14 has a circular connection base section 14a1 and a plurality of salient pole sections 14a2 that radially and outwardly protrude from the circular connection base section 14a1. In one aspect, the circular connection base section 14a1 is generally formed in the shape of a ring defining a central bore. Slots 14a3 are provided between adjacent ones of the salient pole sections 14a2.

A dielectric film composed of a predetermined dielectric material is formed over the entire surface of the stacked layered stator core 14a that is formed from the core plates 14a described above. Driving coils 15 (see FIG. 7) are wound around the respective salient pole sections 14a2 over the dielectric film using the slots 14a3.

Furthermore, as shown in the FIG. 7, the bearing sleeve 13 has a bearing bore hole formed in a center thereof, and a rotary shaft 21 that forms the rotor assembly 20 is rotatably inserted in the bearing bore hole. A radial dynamic pressure bearing section RB is formed in a gap between a surface of the rotary shaft 21 and an internal peripheral surface of the bearing bore hole of the bearing sleeve 13. Also, a plate-shaped thrust plate 23 is fixedly attached to a lower end of the rotary shaft 21. A counter plate 16 is provided at a lower end section of the bearing sleeve 13. Thrust dynamic pressure bearing sections SBa and SBb are formed between the thrust plate 23 and the bearing sleeve 13 and between the thrust plate 23 and the counter plate 16, respectively.

On the other hand, a rotor hub 22 forms the rotor assembly 20 together with the rotor shaft 21. The rotor hub 22 is formed from a generally cup-shaped member composed of an aluminum metal material.

The rotor hub 22 has a coupling hole 22 provided at its center. An upper end portion of the rotary shaft 21 is coupled to the coupling hole 22 by pressure insertion or shrink-fit to connect the rotor hub 22 and the rotary shaft 21 in one body. The rotor hub 22 has a generally cylindrical body portion 22a for mounting a recording media disk on its outer peripheral section, and a circular driving magnet 22c attached through a back yolk 22b to an internal wall surface in the lower side of the body section 22a, as shown in the figure. The circular driving magnet 22c is disposed in proximity to and circularly opposing to an external peripheral side surface of the stator core 14.

The stacked layered core 14 having the structure described above may be used for a spindle motor for HDDs. The stacked layered core 14 is formed by successively stacking in layers a plurality of core plates 14a, each having the shape shown in FIG. 1, as described above.

In accordance with one embodiment of the present invention, supporting recessed sections 14a5 are provided at three locations at generally equal intervals on an inner peripheral surface of the circular connection based section 14a1 of the stacked layered core 14. In other words, the supporting recessed sections 14a5 are provided on an inner peripheral fixing surface 14a4 of the central hole of the circular connection based section 14a1 of the stacked layered core 14 on the opposite side of the salient pole sections 14a2. The three supporting recessed sections 14a5 are formed in a manner to respectively correspond to three protruded sections 2b that are provided on a core retaining jig 2 (see FIG. 5 and FIG. 6) that is used in the process of forming a dielectric film. Each of the supporting recessed sections forms a concave groove extending in the axial direction and having a rectangular cross-section in the stacked layered stator core 17 (see FIG. 7) that is formed by stacking in layers the core plates 14a.

Figure 2:
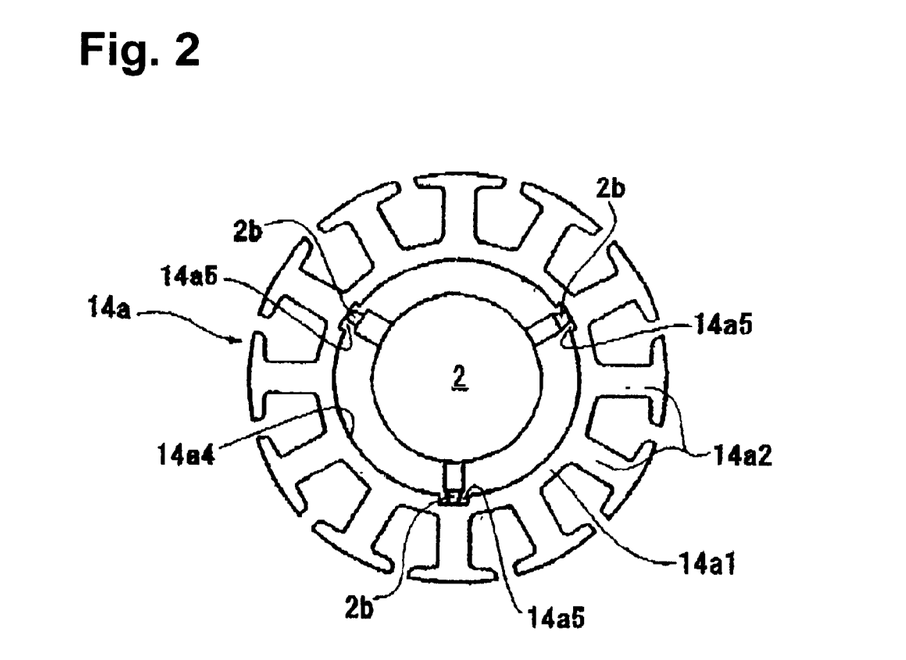
FIG. 2 is an illustration to describe the state in which a core retaining jig supports a stacked layered core that is composed of the core plates shown FIG. 1.
Figure 3:
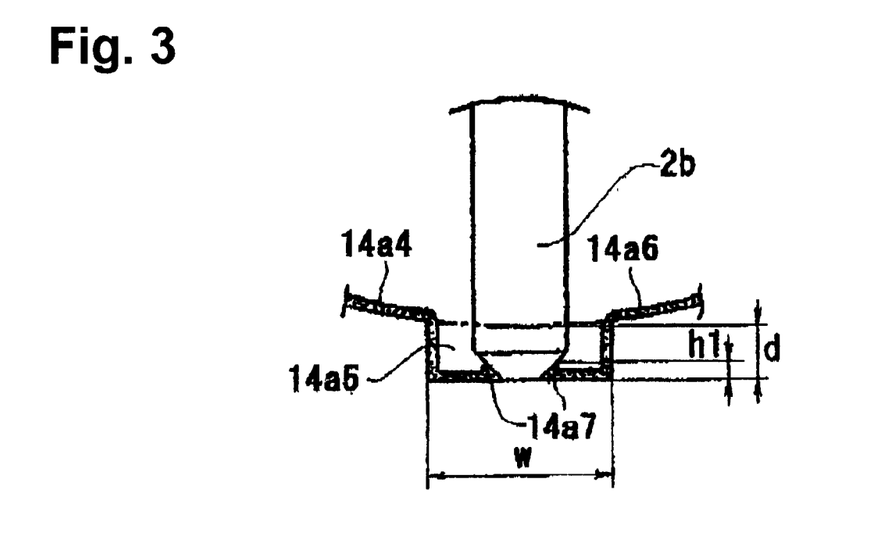
FIG. 3 shows an enlarged side view of a portion of a supporting concave section of the stacked layered core shown in FIG. 2.

In particular, as shown in FIG. 2 and FIG. 3, each of the tip sections of the protruded sections 2b of the core retaining jig 2 is inserted in each of the grooves 14a5 formed in the stacked layered stator core 14. Each of the tip sections of the protruded sections 2b of the core retaining jig 2 abuts to a bottom portion of the groove. In one embodiment, each of the grooves formed by each of the supporting groove sections 14a5 has a groove width w and a groove depth d that can receive each of the protruded sections 2b of the core retaining jig 2. When a dielectric film 14a6 is coated, a bump portion 14a7 of the dielectric film 14a6 may be formed at the bottom section of the groove that is brought in contact with a tip section of the protruded section 2b of the core retaining jig 2. When the bump portion 14a7 has a height h1, the groove is formed in a manner that the groove depth d is greater than the height h1 (i.e., d>h1).

The tip portion of the protruded section 2b of the core retaining jig 2 may preferably abut to the bottom portion of the concave groove 14a5 in a central area of the bottom portion of the concave groove 14a5. To bring the tip portion of the protruded section 2b of the core retaining jig 2 in the central area: of the bottom portion of the concave groove 14a5, a sloped guide face may preferably be provided in a manner that the groove depth d becomes the maximum at the central area of the bottom portion of the groove. By providing the sloped guide surface in advance, when the stacked layered stator core 14 is retained by the three protruded sections 2b of the core retaining jig 2, as shown in FIG. 2, each of the protruded sections 2b of the core retaining jig 2 supports the stacked layered stator core 14 at the central area of the bottom portion of the concave groove 14a5. As a result, various problems that may be caused by the protruded section 2b of the core retaining jig 2 can be avoided. For example, the protruded section 2b of the core retaining jig 2 can avoid contact with an inside surface of the concave groove 14a8.

Figure 4:
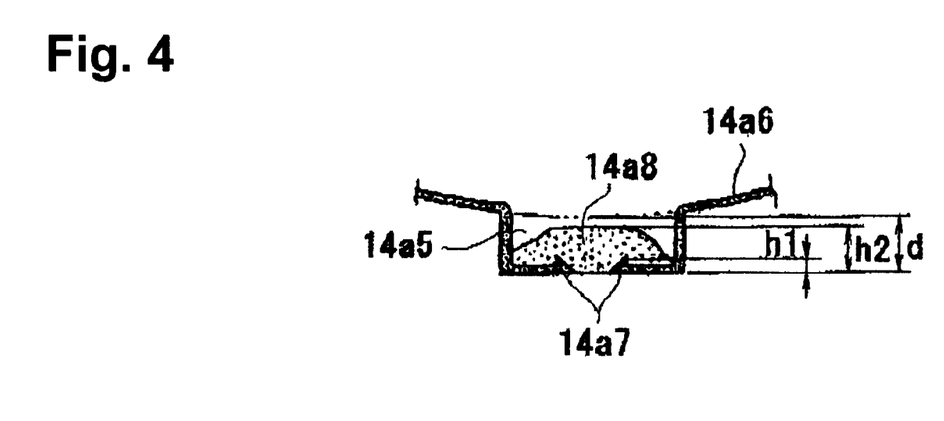
FIG. 4 shows a side view illustrating the state in which a sealing material is coated on the portion of the supporting concave section of the stacked layered core shown in FIG. 2.

Also, as shown in FIG. 4, the supporting concave groove 14a5 of the present embodiment defining a concave groove is formed in a manner capable of storing a sealing material 14a8 to cover portions where the dielectric film 14a6 is not formed due to the protruded section 2b of the core retaining jig 2 contacting the bottom portion-of the concave groove. The groove depth d of the supporting concave groove 14a5 is greater than a height h2 of the sealing material 14a8 (i.e., d>h2>h1).

When a dielectric coating film 14a6 is formed over the stacked layered stator core 14 having the supporting groove section 14a5 described above, the core retaining jig 2 describe above is used to support the entire body of the stacked layered stator core 14. In one embodiment, the tip end portions of the three protruded sections 2b of the core retaining jig 2 are brought in contact with the bottom portions of the respective three supporting concave grooves 14a5 provided on the inner peripheral fixing surface 14a4 of the circular connection based section 14a1 of the stack layered stator core 14. As a result, the entire body of the stacked layered stator core 14 is supported by the core retaining jig 2. The shaft sections 2c of the core retaining jig 2 that supports the stacked layered stator core 14 are mounted on a pair of screw conveyors 3 provided in a painting apparatus shown in FIG. 5. As the screw conveyors 3 are rotatably driven, the core retaining jig 2 is transferred in one direction together with the stack layered stator core 14 to perform a coat-paining of the dielectric film 14a6.

At this moment, the protruded sections 2b of the core retaining jig 2 5 are in contact with the bottom portions provided inside the supporting groove sections 14a5 of the circular connection based section 14a1 of the stacked layered stator core 14. As a. result, the bump section 14a7 of the dielectric coating film 14a6 in the form of a bur, which is formed in the groove section that contacts the protruded section 2b of the core retaining jig 2, is formed receded inside the supporting groove section 14a5. Therefore the bump section 14a7 does not affect the inner peripheral fixing surface 14a4 of the circular connection base section 14a1 for retaining the stacked layered stator core 14 or the internal diameter thereof Also, when the core retaining jig 2 is removed from the stacked layered stator core 14, damages that may be caused by the protruded section 2b of the core retaining jig 2 may only be generated inside the supporting groove section 14a5 of the circular connection based !section 14a1. The damaged portions neither affect the inner peripheral fixing surface 14a4 of the circular connection base section 14a1 or the internal diameter thereof Furthermore, in accordance with the embodiment of the present invention, when a sealing material 14a8 for rust prevention is coated over the bottom sections of the grooves that are in contact with the protruded sections 2b of the core retaining jig 2, the sealing material 14a8 deposits receded inside the supporting concave sections 14a5. As a result, the sealing material 14a8 does not affect the inner peripheral fixing surface 14a4 of the circular connection base section 14a1 or the internal diameter thereof In addition, when the sealing material 14a8 is being coated, the supporting concave sections 14a5 can be used as positional markers for the coating work, and therefore an improved workability is attained.

The embodiment of the present invention made by the inventors is described above. However, the present invention is not limited to the embodiment described above, and many modifications can be made without departing from the subject matter of the present invention.

For example, in the embodiment described above, the president invention is applied to an inner-rotor type stacked layered core. However, the president invention is likewise applicable to an outer-rotor type stacked layered core that has a circular connection base section in which salient poles protrude inwardly from an inner surface of the circular connection base section. In the case of an inner-rotor type stacked layered core, supporting groove sections 14a5 are provided on an outer peripheral surface of the circular connection base section.

Also, the present invention is not limited to a motor for a hard disk drive (HDD) such as the one described in the above embodiment, but is likewise applicable to a variety of other motors and generators.

As described above, in the stacked layered core and the method for manufacturing the same in accordance with the present invention described above, the protruded sections of the core retaining jig are brought in contact with the interior of the supporting concave sections provided in the core circular connection base section of the stacked layered core. As a result, bumps of the dielectric coating film that may be generated at locations where the protruded sections of the core retaining jig are in contact with the concave sections do not protrude from the supporting concave sections. Also, damages, which may be caused by the protruded sections of the core retaining jig when the core retaining jig is removed, are generated only inside the. supporting concave sections formed in the connection base section of the stacked layered core. Therefore, the bumps of the dielectric coating film and the damaged portions do not affect the diametrical dimensions of the stacked layered core at all when the connection base section of the stacked layer core is affixed to, for example, a bearing holder of a motor, and therefore the productivity of stacked layered cores can be improved.

Furthermore, the supporting concave sections may be formed in a manner that, when a sealing material for rust prevention is coated over portions that are in contact with the protruded sections of the core retaining jig, the sealing material is formed receded inside the supporting concave sections such that the sealing material does not protrude from the concave sections. As a result, influences on the diametrical dimension of the fixing surface of the stacked layered core by the sealing material can be eliminated. Also, since the dimensional influences do not have to be considered, the coating work in coating the sealing material can be facilitated.

While the description above refers to particular embodiments of the present invention, it will be understood that many modifications may be made without departing from the spirit thereof The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A method for manufacturing a stacked layered core, the method comprising:

forming a core body by stacking a plurality of core plates in layers, each of the core plates having a connection base. section formed in a circular shape and a plurality salient pole sections radially extending from the connection base section, the core body having a fixing-side peripheral surface opposite to a side of the connection base section where the plurality of salient pole sections are provided, and at least one retaining recessed section being provided on the fixing-side peripheral surface of the connection base section;

inserting a protruded section of a core retaining jig in the at least one retaining recessed section of the connection base section of the core body;

supporting the core body by the protruded section of the core retaining jig at the fixing-side peripheral surface of the connection base section of the core body; and forming a dielectric film over an external surface of the core body, while the core body is supported by the protruded section of the core retaining jig.

2. A method for manufacturing a stacked layered core according to claim 1, further comprising the step of forming the at least one retaining recessed section to have a depth greater than a thickness of a bump of the dielectric film formed in the retaining recessed section that abuts the protruded section of the core retaining jig.

3. A method for manufacturing a stacked layered core according. to claim 1, further comprising the steps of removing the protruded section of the core retaining jig from the supporting recessed section of the connection base section, and applying a sealing material on a portion of the supporting recessed section of the connection base that has been in contact with the protruded section of the core retaining jig.

4. A method for manufacturing a stacked layered core according to claim 3, wherein the sealing material is applied in an amount that is contained within the supporting recessed section of the connection base section of the core body.

* * * * *